United States Patent
Allison et al.

(10) Patent No.: US 11,649,859 B1
(45) Date of Patent: May 16, 2023

(54) VIBRATION DAMPENING FOR SCANNER BEARING

(71) Applicant: AKTIEBOLAGET SKF, Gothenburg (SE)

(72) Inventors: Bryan Allison, Clymer, NY (US); Philip Jones, North East, PA (US); Joel Lawrence, Erie, PA (US); Jason Williams, Erie, PA (US)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 17/556,077

(22) Filed: Dec. 20, 2021

(51) Int. Cl.
| | |
|---|---|
| *F16C 27/06* | (2006.01) |
| *F16C 35/07* | (2006.01) |
| *F16C 35/04* | (2006.01) |
| *F16C 19/18* | (2006.01) |
| *F16C 19/54* | (2006.01) |

(52) U.S. Cl.
CPC .............. *F16C 35/04* (2013.01); *F16C 19/18* (2013.01); *F16C 19/547* (2013.01); *F16C 27/066* (2013.01)

(58) Field of Classification Search
CPC ...... F16C 19/163; F16C 19/18; F16C 19/547; F16C 27/066; F16C 35/04; F16C 35/07; F16C 35/073; F16C 35/077; F16C 2300/14
See application file for complete search history.

(56) References Cited

U.S. PATENT DOCUMENTS

| | | | | |
|---|---|---|---|---|
| 3,309,154 A | * | 3/1967 | Stokely | F16C 27/066 384/536 |
| 3,756,675 A | * | 9/1973 | Mangiavacchi | F16C 27/066 384/536 |
| 5,492,418 A | * | 2/1996 | Brassard | F16C 35/00 384/489 |
| 5,975,764 A | * | 11/1999 | Okada | F16C 35/077 384/493 |
| 6,007,252 A | | 12/1999 | Thelen et al. | |
| 9,103,372 B2 | | 8/2015 | Ciulla et al. | |

(Continued)

FOREIGN PATENT DOCUMENTS

| | | | | |
|---|---|---|---|---|
| DE | 102007037792 A1 | * | 2/2009 | ........... F04D 19/042 |
| DE | 102018122154 A1 | | 3/2020 | |

(Continued)

*Primary Examiner* — Phillip A Johnson
(74) *Attorney, Agent, or Firm* — J-Tek Law PLLC; Scott T. Wakeman; Mark A. Ussai

(57) ABSTRACT

A thin section bearing assembly is for a gantry assembly and includes inner and outer rings each having inner and outer circumferential surfaces and rolling elements grooves and are each sized such that a ratio of the inside diameter to radial thickness is at least thirty (30). A plurality of rolling elements, preferably balls, are disposed between the outer ring groove and the inner ring groove. At least one elastomeric annular damper is disposed between the outer ring and the housing and/or between the inner ring and the rotor and has first and second axially spaced sections. As such, the first section is compressed more than the second section under bending moments in a first angular direction and the second section is compressed more than the first section under moments in a second angular direction. The one or more annular dampers each have a thickness calculated to optimize vibration reduction.

20 Claims, 8 Drawing Sheets

(56) References Cited

U.S. PATENT DOCUMENTS

| | | |
|---|---|---|
| 2001/0010438 A1 | 8/2001 | Bouille et al. |
| 2005/0008274 A1 | 1/2005 | Helbig et al. |
| 2016/0195130 A1 | 7/2016 | Moratz |

FOREIGN PATENT DOCUMENTS

| | | | | |
|---|---|---|---|---|
| EP | 301130 A | * | 2/1989 | ............ F16C 27/066 |
| FR | 3042239 A1 | | 4/2017 | |
| JP | 2001050268 A | * | 2/2001 | ............... B62D 1/16 |
| KR | 102020355 B1 | | 9/2019 | |

* cited by examiner

US 11,649,859 B1

VIBRATION DAMPENING FOR SCANNER BEARING

BACKGROUND OF THE INVENTION

The present invention relates to bearings, and more particularly to rolling element bearings for gantry assemblies.

Gantry assemblies for machines such as luggage security scanners, CT scanners, radiotherapy machines, etc. typically include a stationary frame with a central opening for receiving a patient or an object being scanned and a rotatable assembly with diagnostic, scanning or/and treatment devices which scan or radiate the object (e.g., a piece of luggage) or patient within the frame opening. Typically, the rotatable assembly is connected with the frame by a bearing assembly, such as a thin section bearing. Due to the relatively large diameter and minimal radial thickness of the bearing rings of a thin section bearing, such bearings may experience a significant degree of vibration, which can generate undesirable noise levels during the use of the scanner assembly.

SUMMARY OF THE INVENTION

In one aspect, the present invention is a thin section bearing assembly for a gantry assembly, the gantry assembly including a static housing with a bore and a rotor rotatable about a central axis. The bearing assembly comprises a bearing outer ring disposable within the housing bore and having an inner circumferential surface with an annular groove, an outer circumferential surface, a radial thickness between the inner circumferential surface and the outer circumferential surface and an inside diameter. The outer ring is sized such that a ratio of the inside diameter to radial thickness is at least thirty (30). A bearing inner ring is disposable about the rotor and has an inner circumferential surface, an outer circumferential surface with an annular groove, a radial thickness between the inner circumferential surface and the outer circumferential surface and an inside diameter. The inner ring is sized such that a ratio of the inside diameter to radial thickness is at least thirty (30). A plurality of rolling elements are disposed between the outer ring groove and the inner ring groove. Further, at least one elastomeric annular damper is disposed between the outer ring and the housing and/or between the inner ring and the rotor. The at least one annular damper has a first section and a second section spaced axially apart from the first section. As such, a compression of the first section is greater than a compression of the second section when a bending moment is applied to the bearing assembly in a first angular direction, and the compression of the second section is greater than the compression of the first section when a bending moment is applied to the bearing assembly in a second, opposing angular direction so as to increase a fatigue life of the at least one annular damper.

In another aspect, the present invention is again a thin section bearing assembly for a gantry assembly, the gantry assembly including a static housing with a bore and a rotor rotatable about a central axis. The bearing assembly comprises a bearing outer ring disposable within the housing bore and having an inner circumferential surface with an annular groove, an outer circumferential surface, a radial thickness between the inner circumferential surface and the outer circumferential surface and an inside diameter. The outer ring is sized such that a ratio of the inside diameter to radial thickness is at least thirty (30). A bearing inner ring is disposable about the rotor and has an inner circumferential surface, an outer circumferential surface with an annular groove, a radial thickness between the inner circumferential surface and the outer circumferential surface and an inside diameter. The inner ring is sized such that a ratio of the inside diameter to radial thickness is at least thirty (30). A number (R) of balls are disposed between the outer ring groove and the inner ring groove and traverse a circular path with a pitch diameter (D), each ball having a diameter ($D_R$) and contacting each of the inner ring groove and outer ring groove at a contact angle ($\alpha$). Further, at least one elastomeric annular damper disposed between the outer ring and the housing and/or between the inner ring and the rotor, the at least one elastomeric annular damper having a radial thickness ($t_D$), an axial width (b) and a hardness (S) on the Shore A hardness scale. The bearing assembly is configured to support a radial load (F) and to rotate at an angular speed (N) and the radial thickness ($t_D$) of the at least one annular damper is calculated as follows:

$$t_D = 611.538 bDNR * \frac{(56 + 7.623365S)(1 + D_R/D * \cos\alpha)(1 + 0.349D)}{F * (254 - 2.54S)}$$

In a further aspect, the present invention is again a thin section bearing assembly for a gantry assembly, the gantry assembly including a static housing with a bore and a rotor rotatable about a central axis. The bearing assembly comprises a bearing outer ring disposable within the housing bore and having an inner circumferential surface with an annular groove, an outer circumferential surface, a radial thickness between the inner circumferential surface and the outer circumferential surface and an inside diameter. The outer ring is sized such that a ratio of the inside diameter to radial thickness is at least thirty (30). A bearing inner ring is disposable about the rotor and has an inner circumferential surface, an outer circumferential surface with an annular groove, a radial thickness between the inner circumferential surface and the outer circumferential surface and an inside diameter. The inner ring is sized such that a ratio of the inside diameter to radial thickness is at least thirty (30). A number of balls are disposed between the outer ring groove and the inner ring groove. Further, at least one elastomeric annular damper is disposed between the outer ring and the housing and/or between the inner ring and the rotor, the at least one elastomeric annular damper being configured to have a first natural frequency that is no greater than about one third of a ball pass frequency of the bearing assembly.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Figure 1:
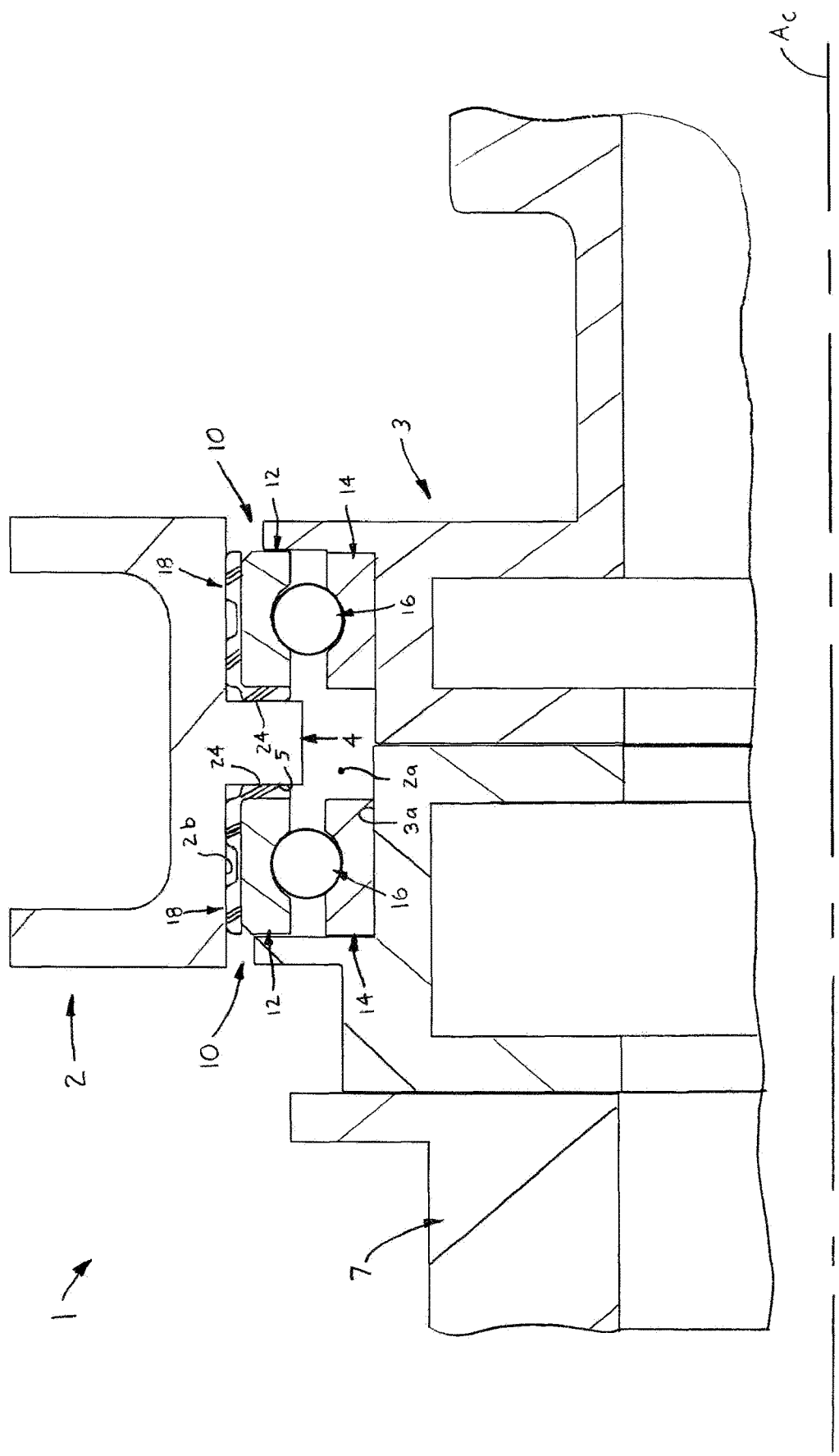
FIG. 1 is broken-away, axial cross-sectional view of an upper, central portion of a gantry assembly having two bearing assemblies in accordance with the present invention, shown with an outer annular damper and an outer axial damper.
Figure 2:
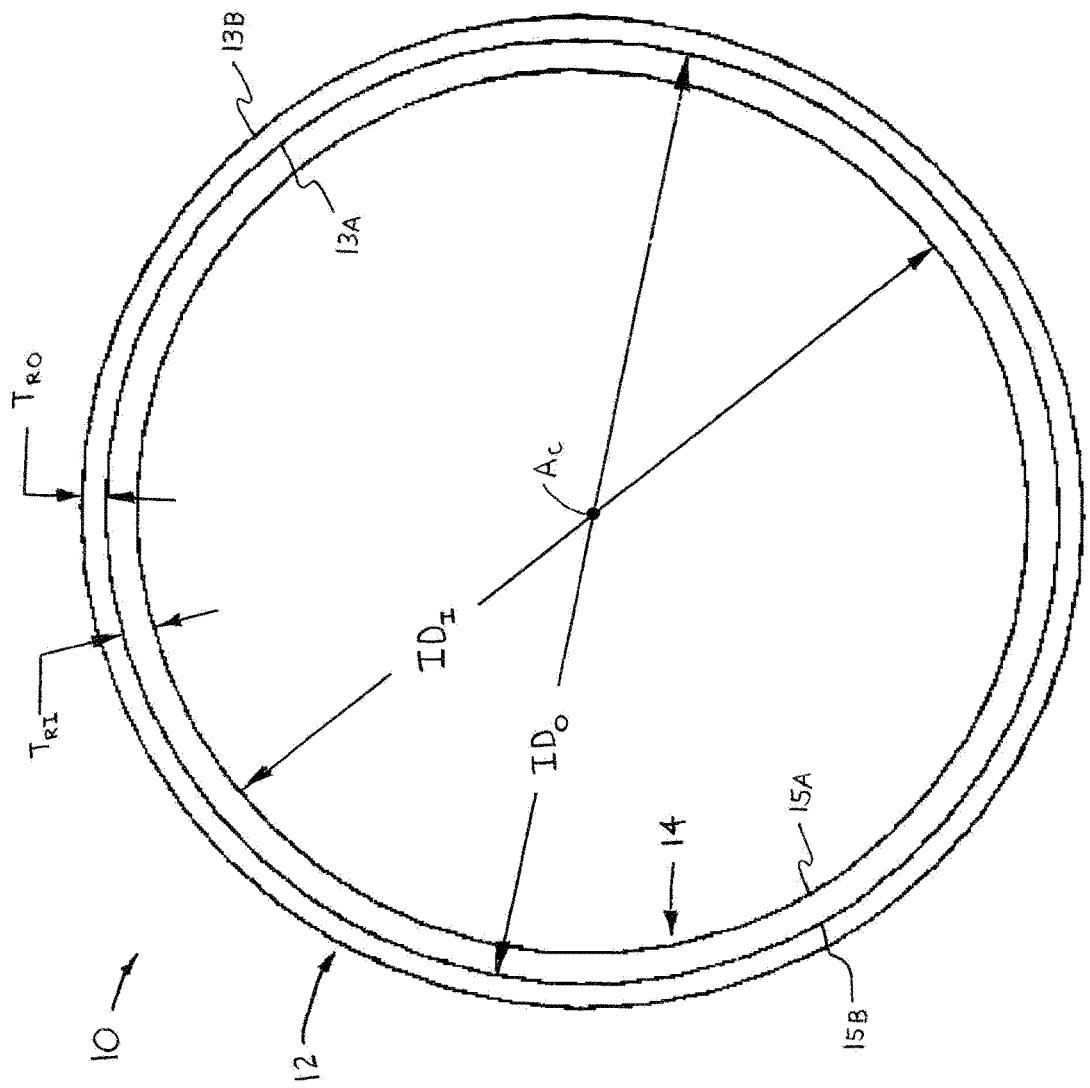
FIG. 2 is a top plan view of one bearing assembly separate from the gantry assembly.

Certain terminology is used in the following description for convenience only and is not limiting. The words "lower", "upper", "upward", "down" and "downward" designate directions in the drawings to which reference is made. The words "inner", "inwardly" and "outer", "outwardly" refer to directions toward and away from, respectively, a designated centerline or a geometric center of an element being described, the particular meaning being readily apparent from the context of the description. Further, as used herein, the words "connected" and "coupled" are each intended to include direct connections between two members without any other members interposed therebetween and indirect connections between members in which one or more other members are interposed therebetween. The terminology includes the words specifically mentioned above, derivatives thereof, and words of similar import.

Referring now to the drawings in detail, wherein like numbers are used to indicate like elements throughout, there is shown in FIGS. 1-9 a thin section bearing assembly 10 for a gantry assembly 1, the gantry assembly 1 including a static housing 2 with a bore 2a and a rotor 3 rotatable about a central axis $A_C$. Preferably, the gantry assembly 1 is part of a luggage security scanner including a rotatable drum 7 (FIG. 1) connected with the rotor 3, on which are mounted various imaging or scanning equipment, and a support frame (not shown) connected with the housing 2, the details of which are beyond the scope of the present disclosure. However, the gantry assembly 10 may be incorporated into a "CT" scanner (i.e., computed tomography scanner), a radiation treatment machine (e.g., external beam radiotherapy) or any other machine or device for rotating imaging or treatment equipment, or any other appropriate devices, about a central axis $A_C$. The bearing assembly 10 basically comprises a bearing outer ring 12 disposable within the housing bore 2a, an inner ring 14 disposable about the rotor 3, a plurality of rolling elements 16 disposed between the inner and outer rings 12, 14 and at least one elastomeric annular damper 18 disposed between the outer ring 12 and the housing 2 or/and the inner ring 14 and the rotor 3. In use of the gantry assembly 1, the bearing assembly 10 is intended to support a radial load F between two thousand, two hundred Newtons (2200 N) and twenty two thousand Newtons (22,000 N), or between five hundred pounds force (500 lbf) and five thousand pounds force (5000 lbf), and to rotate at an angular speed N within the range of fifty rotations per minute and about five hundred rotations per minute (500 rpm).

Figure 3:
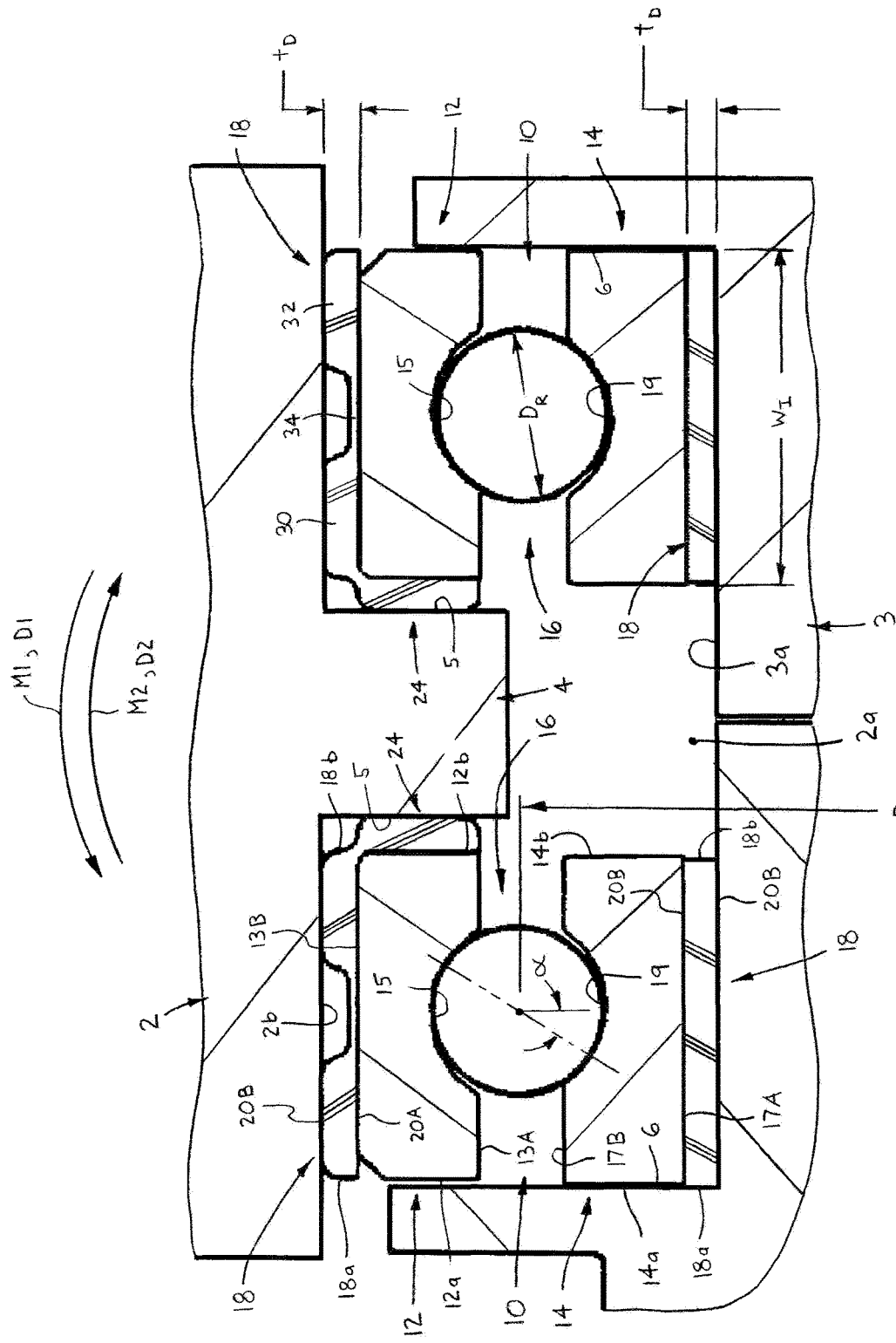
FIG. 3 is an enlarged, broken-away view of the two bearing assemblies of FIG. 1, shown with both inner and outer annular dampers and an outer axial damper.
Figure 4:
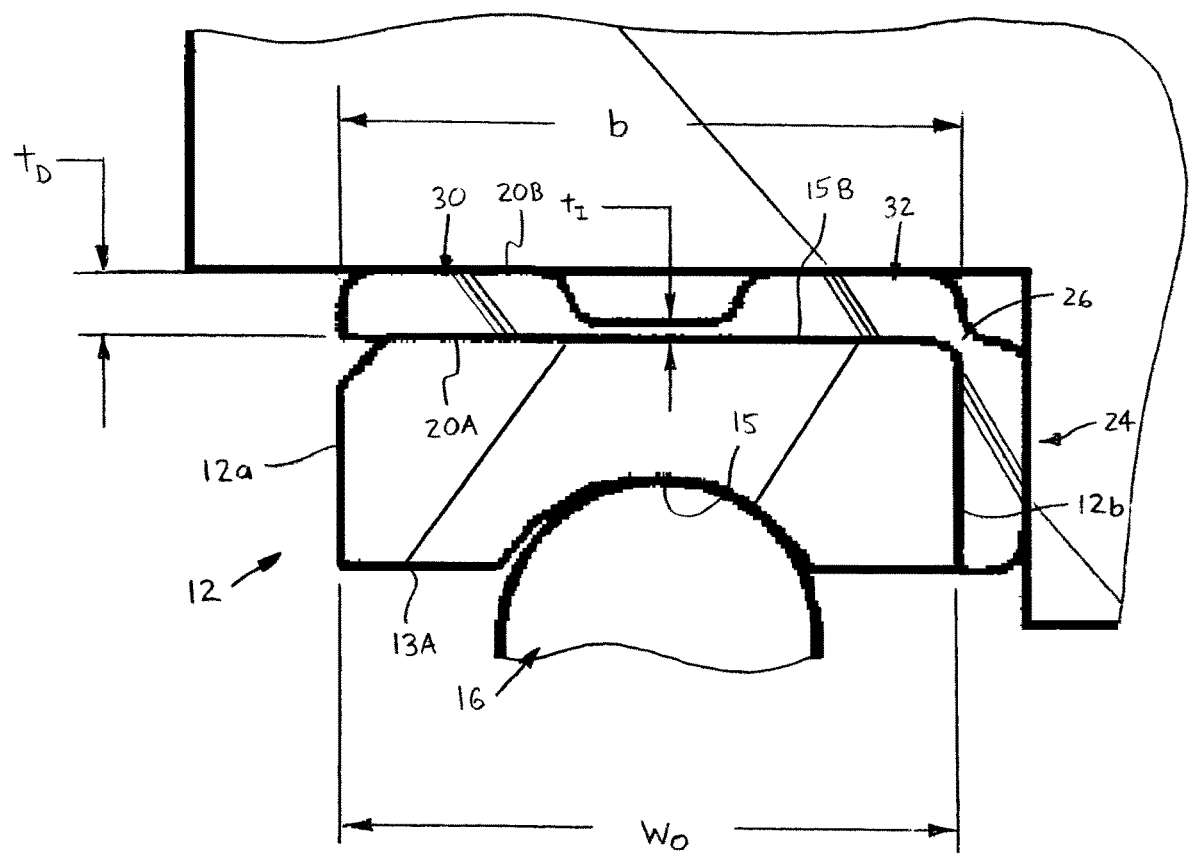
FIG. 4 is more enlarged, broken-away view of the outer portion of a single bearing assembly.
Figure 5:
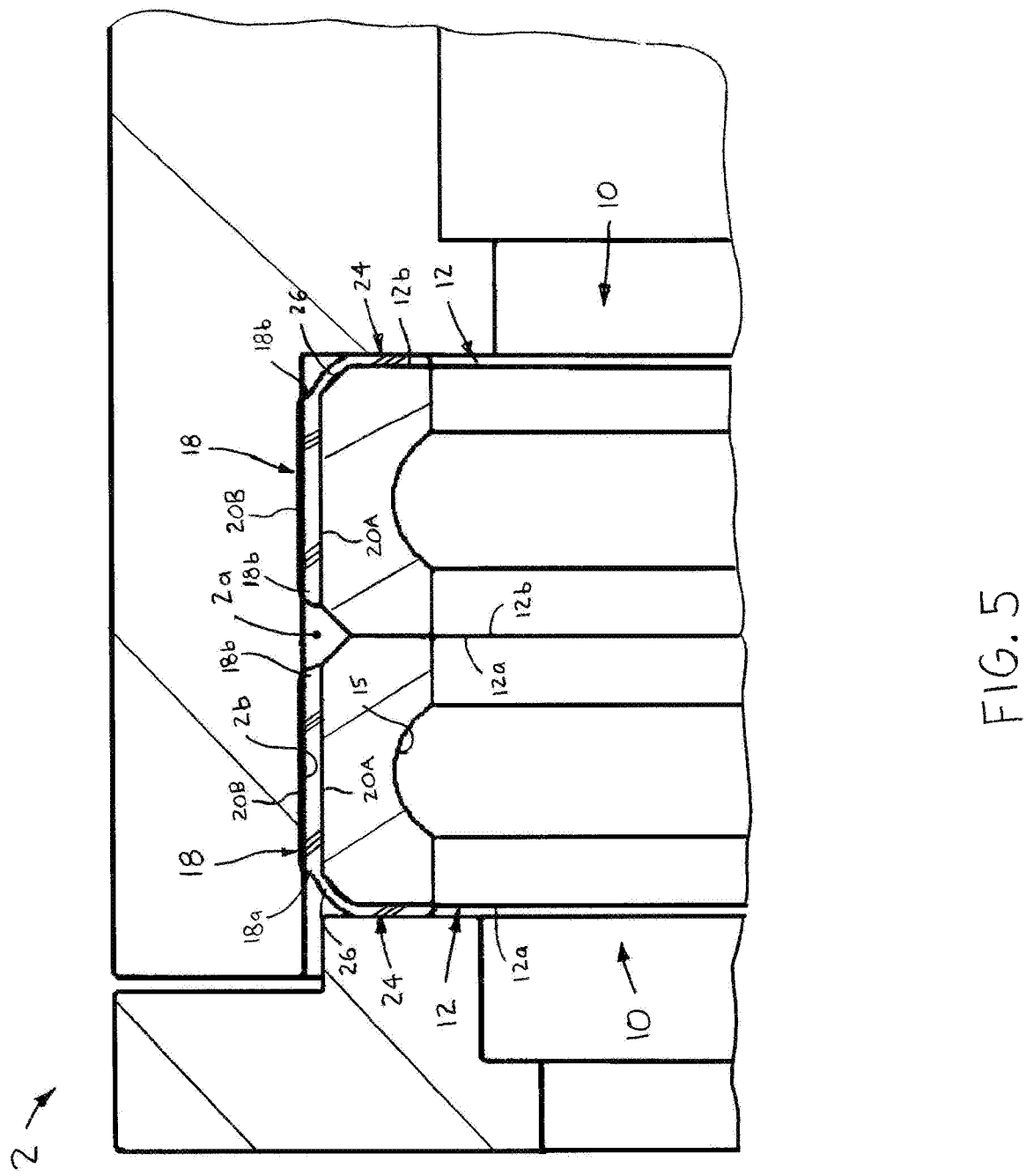
FIG. 5 is a broken-away, axial cross-sectional view of a portion of an alternative gantry assembly, shown with the outer rings of two bearing assemblies disposed in contact.
Figure 6:
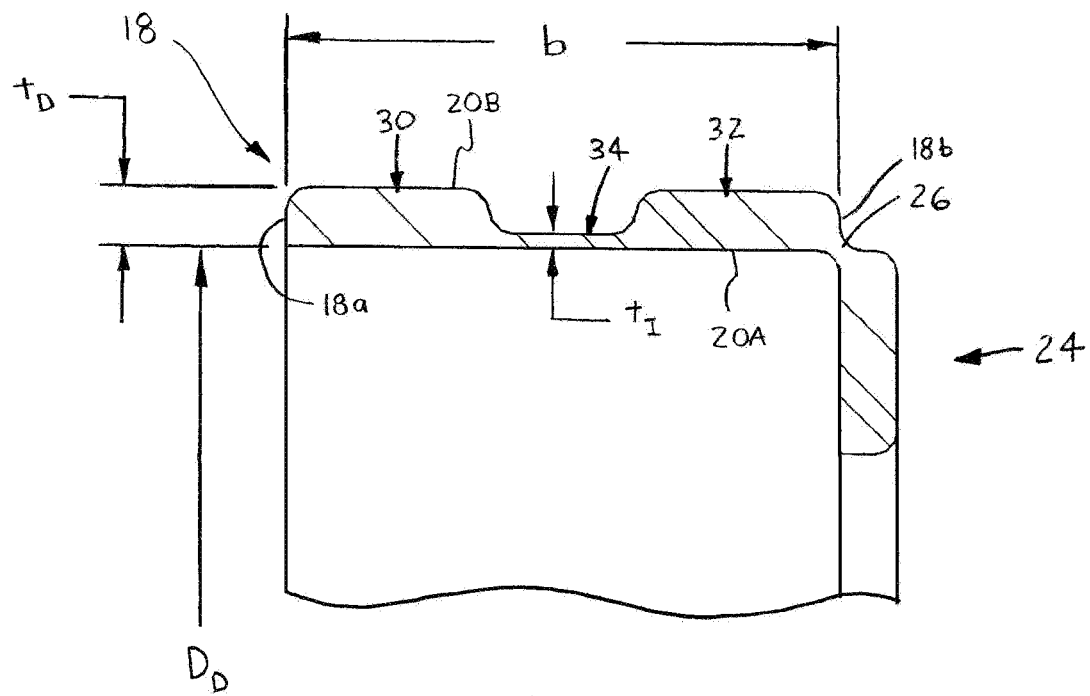
FIG. 6 is a broken-away side elevational view of an upper portion of a combined annular damper and integral axial damper disk, shown with an annular damper having two annular damper sections.

Preferably, the gantry assembly 1 includes two bearing assemblies 10 coupling the housing 2 and the rotor 3, as shown in FIGS. 1, 3 and 5. The two bearing assemblies 10 may be formed so as to be disposed on separate sides of a radial rib 4 extending into the housing bore 2a, as shown in FIGS. 1 and 3, or may be disposed within the bore 2a so as to abut each other, as depicted in FIG. 5. In either case, the two preferred bearing assemblies 10 are preferably identically formed, although not necessarily so, such that only one bearing assembly 10 is described in detail herein. Further, the gantry assembly 1 may include only a single bearing assembly 10 or three or more bearing assemblies (neither structure shown) as shown and described herein.

Referring to FIGS. 1-3 and 5, the outer ring 12 has opposing axial ends 12a, 12b, an inner circumferential surface 13A with a groove 15 and an outer circumferential surface 13B. The outer ring 12 is sized having an axial width $w_O$ between the axial ends 12a, 12b, a radial thickness $T_{RO}$ (FIG. 2) between the inner and outer surfaces 13A, 13B and an inside diameter $ID_O$. As the bearing assembly 10 is of the type referred to as "thin section" as discussed above, the outer ring 12 is sized such that a ratio of the inside diameter $ID_O$ to the radial thickness $T_{RO}$ is at least thirty (30). Further, the bearing inner ring 14 has opposing axial ends 14a, 14b, an inner circumferential surface 17A and an outer circumferential surface 17B with an annular groove 19. The inner ring 14 is sized having an axial width $w_I$, a radial thickness $T_{RI}$ between the inner and outer surfaces 17A, 17B and an inside diameter $ID_I$. As with the outer ring 12, the inner ring 14 is sized such that a ratio of the inside diameter $ID_I$ to the radial thickness $T_{RI}$ is at least thirty (30).

Further, the plurality of rolling elements 16 are disposed between the outer ring groove 15 and the inner ring groove 19 so as to be rollable simultaneously along the outer and inner rings 12, 14. Preferably, each rolling element 16 is a ball, but may alternatively be a cylindrical roller, a tapered roller, a needle, or any other appropriate type of rolling element. In any case, each of the plurality of rolling elements 16 traverse a circular path about the central axis $A_C$ with a pitch diameter D, which preferably has a value within the range of about fifty centimeters (50 cm) and one hundred eighty centimeters (180 cm). The number "R" of rolling elements/balls 16, the "ball count", in each row of rolling elements 16 is preferably between one hundred (100) and five hundred (500) and each rolling element 16 preferably has a diameter $D_R$ within the range of about six millimeters (6 mm) and twenty millimeters (20 mm). Further, in one preferred application, the bearing assembly 10 is an angular contact ball bearing ("ACBB") in which each rolling element 16 contacts the outer ring groove 15 and the inner ring groove 19 at a contact angle α, as indicated in FIG. 3, as opposed to contacting both of the grooves 15, 19 within a single vertical plane. The contact angle α preferably has a value in the range of between about fifteen (15°) and forty-five degrees (45°).

Due to the relatively substantial flexibility of the rings 12, 14, which is conventional for any thin section bearing, the bearing assembly 10 typically experiences bending moments under loading, which generate vibrations, that exceed the moments and resulting vibration experienced by more conventional bearings. That is, conventional bearings are significantly more rigid than thin section bearings due to the substantially lower ratio between the bearing ID and the ring thickness $T_R$. As such, to reduce vibrations and particularly the noise produced thereby, the bearing assembly 10 includes at least an outer elastomeric annular damper 18 disposed between the outer ring 12 and the housing 2 or/and an inner elastomeric annular damper 18 disposed between the inner ring 14 and the rotor 3. Depending on the specific application of (e.g., medical scanning, luggage scanning, etc.) and the resultant loading on the gantry assembly 10, the bearing assembly 10 may include only an outer elastomeric damper 18 (FIG. 1), only an inner elastomeric damper 18 (not shown) or both an outer elastomeric damper 18 and an inner elastomeric damper 18 (FIG. 3).

Further, each elastomeric annular damper 18 is preferably formed of an elastomer having a hardness on the Shore A scale of between 20 and 90 and has opposing axial ends 18a, 18b and inner and outer circumferential surfaces 20A, 20B. With an outer annular damper 18, the damper inner circumferential surface 20A is disposed about the outer surface 13B of the bearing outer ring 12 and the damper outer circumferential surface 20B is disposed against an inner circumferential surface 2b of the outer housing 2. As shown in FIG. 3, with an inner annular damper 18, the damper inner circumferential surface 20A is disposed about an outer circumferential surface 3a of the rotor 3 and the damper outer circumferential surface 20B is disposed against the inner surface 15A of the bearing inner ring 14.

Figure 9:
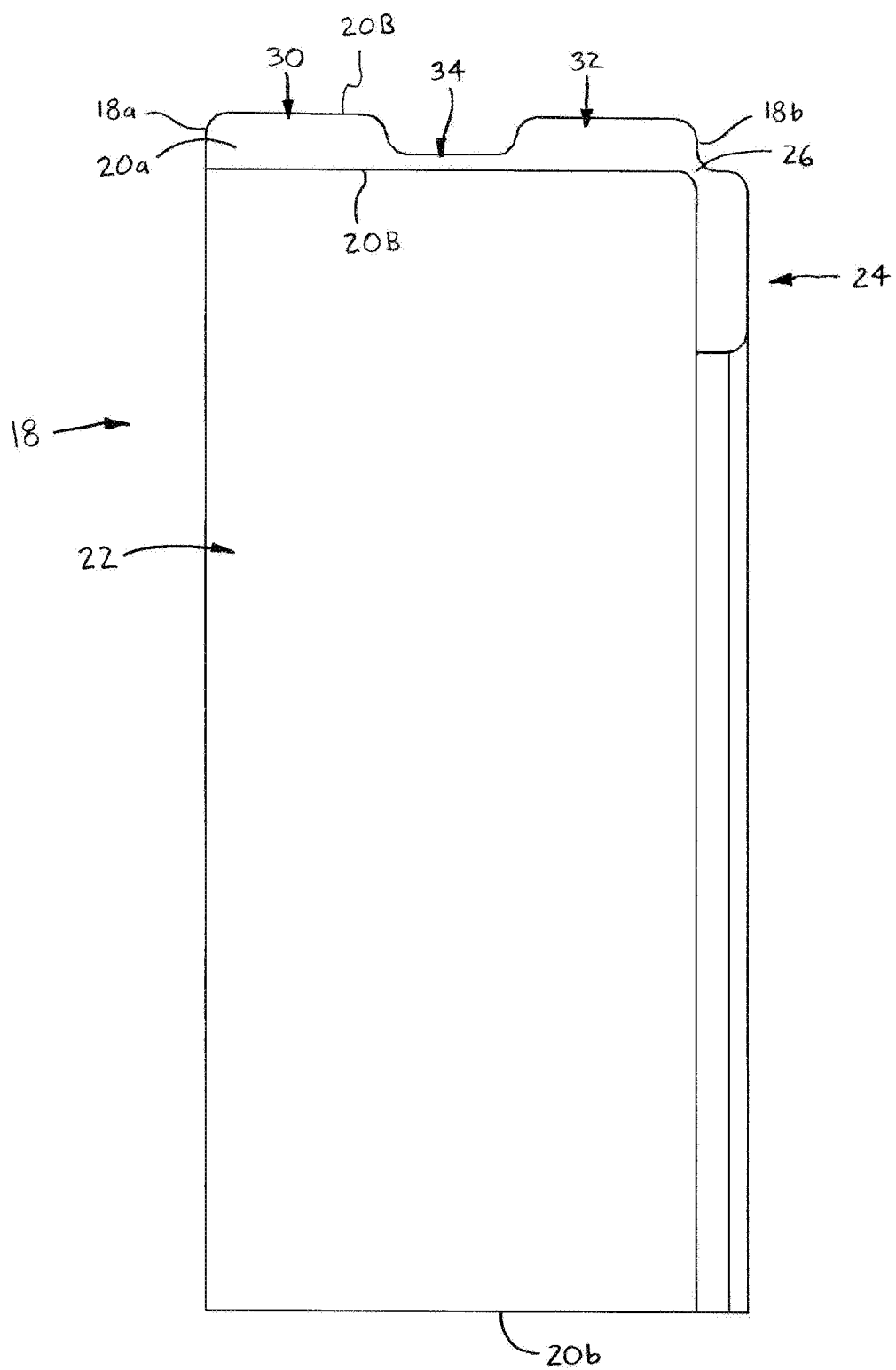
FIG. 9 is a side plan view of one arcuate section of the first construction annular damper and integral axial damper.

Referring particularly to FIG. 9, each annular damper 18 is preferably formed of a plurality of arcuate sections 22 (only one shown), most preferably three or four sections 22, spaced circumferentially about the central axis $A_C$ and each having two opposing circumferential ends 22a, 22b. Each circumferential end 22a, 22b of each one of the arcuate sections 22 is disposed at least adjacent to one of the circumferential ends 22b, 22a of another one of the arcuate sections 22, and preferably the adjacent ends 22a, 22b are abutting. By forming each annular damper 18 as a plurality of arcuate sections 22, the damper 18 is installable by placing each section 22 about the outer surface 13B of the outer ring 12 or about the inner surface 3a of the rotor 3. However, each damper 18 may alternatively be formed as a one-piece annular member which is stretched over the appropriate surface 13B, 3a.

Figure 8:
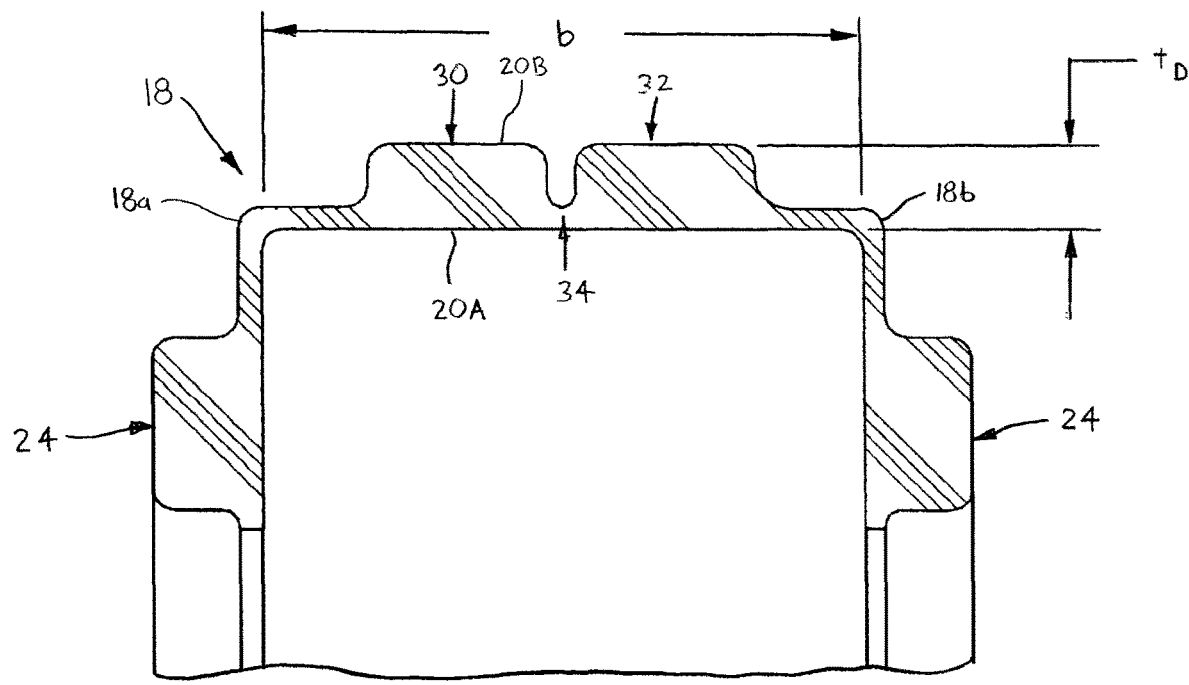
FIG. 8 is a broken-away, side elevational view of an upper portion of a combined annular damper and two axial damper disks.

Furthermore, to increase the vibration dampening capability, the bearing assembly 10 preferably further comprises at least one elastomeric axial damper disk 24 disposed either between one axial end 12a or 12b of the outer ring 12 and a radial surface 5 of the housing 2 and/or between one axial end 14a, 14b of the inner ring 14 and a radial surface 6 of the rotor 3. In addition to damping vibration within the bearing assembly 10, and thus within the gantry assembly 1, the elastomeric annular damper(s) 18 and the axial damper disks 24 also function to electrically and thermally insulate the bearing rings 12, 14. That is, an outer annular damper 18 will prevent or at least reduce thermal heat transfer and electric current flow between the bearing outer ring 12 and the housing 2 and an inner annular damper 18 will prevent/reduce heat transfer and current flow between the inner ring 14 and the rotor 3, with any axial damper disks 24 also preventing thermal and electric flow between the rings 12, 14 and the housing 2 or the rotor 3. Preferably, each axial damper disk 24 is integrally connected with an adjacent annular damper 18 by a web section 26, but may alternatively be formed as a completely separate disk 24 (structure not shown). Further, as shown in FIG. 8, two axial damper disks 24 may be integrally formed with a single annular damper 18.

To enhance the vibration reduction capability of each elastomeric annular damper 18, the one or more dampers 18 are each configured, i.e., by appropriate selection of material and dimensions, to have a first natural frequency ω that is no greater than about one third (⅓) of a ball pass frequency BPF of the bearing assembly 10. As is known, the ball pass frequency BPF of a bearing assembly can be calculated as follows: $BPF = \frac{1}{2} NR*(1\pm((D_R/D)*\cos \alpha)))$; in which N is the bearing rotational speed, R is the number of balls per row of the bearing assembly, $D_R$ is the diameter of each rolling element 16, D is the pitch diameter of the bearing assembly 10 and α is the contact angle of the bearing assembly 10, as each is described above. The natural frequency ω of each one of the annular dampers 18 may be calculated as follows: $\omega = \sqrt{(K/m)}$; in which K is the stiffness of the elastomeric annular damper 18 and m is the mass of each annular damper 18. Both the stiffness K and the mass m are each dependent upon the dimensions of each elastomeric annular damper 18, such as the damper radial thickness $t_D$, the axial width b and the diameter $D_D$.

The stiffness K is also dependent upon the material properties of the specific elastomer and is preferably calculated as follows: $K = E*A/L$; in which E is the modulus of elasticity of the particular elastomeric material, A is the cross-sectional area of the damper 18 and L is the circumferential length of the annular damper 18 (i.e., Π*Diameter $D_D$ of the damper 18).

In calculating the stiffness K and thereafter the natural frequency ω of each annular damper 18, the diameter $D_D$ of the annular damper 18 is determined by size of the particular bearing ring 12 or 14 to which the damper 18 is applied, and thus is established by the size of the bearing assembly 10. Also, each annular damper 18 preferably extends across substantially the entire width $w_O$ or $w_I$ of the particular ring 12, 14, respectively. Specifically, each outer annular damper 18 is preferably sized to extend substantially across the entire axial width $w_O$ of the outer ring 12 and each inner annular damper 18 is sized to extend substantially across the entire axial width $w_I$ of the inner ring 14. Most preferably, each annular damper 18 has an axial width b that is sized such that a ratio of the axial width b of the damper 18 to the axial width $w_O$ or $w_I$ of each one of the outer and inner rings 12, 14 is within the range of about 0.75 and 0.90. That is, $b/w_O = 0.75-0.90$ and $b/w_I = 0.75-0.90$.

As a result of the diameter $D_D$ (and thus the circumferential length L) being established by the size of the bearing assembly 10 and the desired coverage of substantially the entire width $w_O$ or $w_I$ of the bearing rings 12 or 14, the capability of adjusting or establishing the desired natural frequency ω of each elastomeric damper 18 is primarily achieved by careful selection of the maximum thickness $t_D$ of the particular damper 18. As a rough estimate of the damper thickness $t_D$ with intended gantry assemblies 1 requiring the outer and inner rings 12, 14 to be diametrically sized within the range of between about three and one-half feet (3.5 feet or 1.07 meters) and about five feet (5 feet or 1.52 meters), the radial thickness $t_D$ of each of the one more elastomeric annular dampers 18 is preferably between about 0.020" inches (0.5 mm) and about 0.32" (6 mm).

As the damper thickness $t_D$ is particularly critical to optimize vibration damping as described above, it has been determined that a desired radial thickness $t_D$ of each annular damper 18 may be calculated for a desired bearing rotational speed N and applied loading F on the bearing as follows:

$$t_D = 611.538bDNR * \frac{(56 + 7.623365S)(1 + D_R/D * \cos\alpha)(1 + 0.349D)}{F * (254 - 2.54S)}$$

Referring now to FIGS. 4, 6, 8 and 9, to optimize the bearing assembly 10 to handle the expected bending moments on the gantry assembly 1 as discussed above, the at least one elastomeric annular damper 18 preferably has a first section 30 and a second section 32 spaced axially apart from the first section 30 so as to form a double-section damper 18. Specifically, the first section 30 is disposed adjacent to the first axial end 12a or 14a of the respective outer ring 12 or inner ring 14 and the second elastomeric damper section 32 is disposed adjacent to the second axial end 12b or 14b of the respective outer ring 12 or inner ring 14. With this structure, the compression of the first elastomeric damper section 30 is greater than the compression of the second elastomeric damper section 32 when a bending moment M1 is applied to the bearing assembly in a first angular direction D1, as indicated in FIG. 3. Conversely, the compression of the second elastomeric damper section 32 is greater than the compression of the first elastomeric damper section 30 when a bending moment M2 is applied to the bearing assembly 10 in a second, opposing angular direction D2. Thus, the bending loads M1, M2 are primarily absorbed or supported by only one damper section 30 or 32, respectively, as opposed to the entire damper 18 experiencing the full amount of compression, such that the fatigue life of each annular damper 18 formed with two sections 30, 32 is increased.

Figure 7:
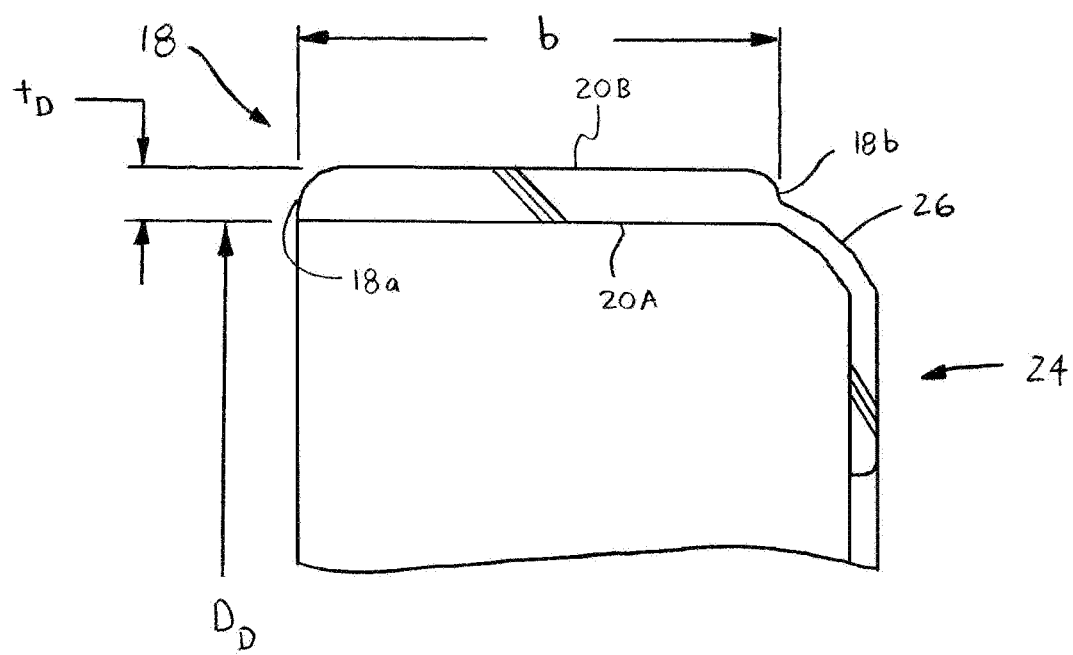
FIG. 7 is a broken-away, side elevational view of an upper portion of a combined annular damper and integral axial damper disk, shown with an annular damper formed of a single section.

Preferably, the damper first section 30 and the damper second section 32 each have a radial thickness $t_D$, preferably calculated as described above, and are connected by an intermediate damper section 34. The intermediate damper section 34 has a radial thickness ti with a value that is less than the value of the radial thickness $t_D$ of each one of the annular first and second sections 30, 32. As such, the intermediate section 34 primarily functions to connect the first and second damper sections 30, 32 and does not support loading between the outer ring 12 and the housing 2 or between the inner ring 14 and the rotor 3. Further, by providing the intermediate section 34 connecting the damper sections 30, 32, the damper first and second sections 30, 32 are installable as a single unit while establishing a desired axial spacing between the two damper sections 30, 32. Although the one or more elastomeric dampers 18 are preferably arranged in two sections 30, 32, most preferably connected by an intermediate section 34, each damper 18 may be formed as a single-section damper of constant radial thickness $t_D$ as depicted in FIGS. 3, 5 and 7.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

We claim:

1. A thin section bearing assembly for a gantry assembly, the gantry assembly including a static housing a bore and a rotor rotatable about a central axis, the bearing assembly comprising:
   a bearing outer ring disposable within the housing bore and having an inner circumferential surface with an annular groove, an outer circumferential surface, a radial thickness between the inner circumferential surface and the outer circumferential surface and an inside diameter, the outer ring being sized such that a ratio of the inside diameter to the radial thickness is at least thirty (30);
   a bearing inner ring disposable about the rotor and having an inner circumferential surface, an outer circumferential surface with an annular groove, a radial thickness between the inner circumferential surface and the outer circumferential surface and an inside diameter, the inner ring being sized such that a ratio of the inside diameter to the radial thickness is at least thirty (30);
   a plurality of rolling elements disposed between the outer ring groove and the inner ring groove; and
   at least one elastomeric annular damper disposed between the outer ring and the housing and/or between the inner ring and the rotor, the at least one annular damper having a first section and a second section spaced axially apart from the first section such that a compression of the first section is greater than a compression of the second section when a bending moment is applied to the bearing assembly in a first angular direction and the compression of the second section is greater than the compression of the first section when a bending moment is applied to the bearing assembly in a second, opposing angular direction so as to increase a fatigue life of the at least one annular damper.

2. The bearing assembly as recited in claim 1 wherein each one of the plurality of rolling elements is a ball having a diameter ($D_R$) and traversing a circular path with a pitch diameter (D), the bearing assembly is configured to support a radial load (F) and to rotate at an angular speed (S), the annular damper has an axial width (b) and each one of the damper first section and the damper second section each have a radial thickness ($t_D$), the radial thickness ($t_D$) being calculated as follows:

$$t_D = 611.538bDNR * \frac{(56 + 7.623365S)(1 + D_R/D * \cos\alpha)(1 + 0.349D)}{F * (254 - 2.54S)}.$$

3. The bearing assembly as recited in claim 1 wherein the damper first section and the damper second section each have a radial thickness and are connected by an intermediate section having a radial thickness less than the radial thickness of each one of the damper first section and the damper second section such that the damper first and second sections are installable as a single unit.

4. The bearing assembly as recited in claim 1 wherein the at least one elastomeric annular damper is configured to have a first natural frequency that is no greater than about one third of a ball pass frequency of the bearing assembly.

5. The bearing assembly as recited in claim 1 wherein the at least one elastomeric annular damper has an axial width and each one of the inner ring and the outer ring has an axial width, the annular damper being sized such that a ratio of the axial width of the damper to the axial width of each one of the inner and outer rings is within the range of about 0.75 and 0.9.

6. The bearing assembly as recited in claim 1 wherein each one of the damper first section and the damper second section each have a radial thickness, the radial thickness having a value within the range of about one half millimeter (0.5 mm) millimeters and about twenty millimeters (20 mm).

7. The bearing assembly as recited in claim 1 wherein each one of the inner ring and the outer ring has two opposing axial ends and the bearing assembly further comprises at least one elastomeric damper disk disposed between one axial end of the outer ring and a radial surface of the housing and/or between one axial end of the inner ring and a radial surface of the rotor.

8. The bearing assembly as recited in claim 1 wherein the at least one elastomeric damper is formed of a plurality of arcuate sections spaced circumferentially about the centerline and each having two opposing circumferential ends, each circumferential end of each one of the arcuate sections being disposed at least adjacent to one of the circumferential ends of another one of the arcuate sections.

9. A thin section bearing assembly for a gantry assembly, the gantry assembly including a static housing a bore and a rotor rotatable about a central axis, the bearing assembly comprising:
- a bearing outer ring disposable within the housing bore and having an inner circumferential surface with an annular groove, an outer circumferential surface, a radial thickness between the inner circumferential surface and the outer circumferential surface and an inside diameter, the outer ring being sized such that a ratio of the inside diameter to the radial thickness is at least thirty (30);
- a bearing inner ring disposable about the rotor and having an inner circumferential surface, an outer circumferential surface with an annular groove, a radial thickness between the inner circumferential surface and the outer circumferential surface and an inside diameter, the inner ring being sized such that a ratio of the inside diameter to the radial thickness is at least thirty (30);
- a number (R) of balls disposed between the outer ring groove and the inner ring groove and traversing a circular path with a pitch diameter (D), each ball having a diameter ($D_R$) and contacting each of the inner ring groove and outer ring groove at a contact angle ($\alpha$); and
- at least one elastomeric annular damper disposed between the outer ring and the housing and/or between the inner ring and the rotor, the at least one elastomeric annular damper having a radial thickness ($t_D$), an axial width (b) and a hardness (S) on the Shore A hardness scale;

wherein the bearing assembly is configured to support a radial load (F) and to rotate at an angular speed (N) and the radial thickness ($t_D$) of the at least one annular damper is calculated as follows:

$$t_D = 611.538 b D N R * \frac{(56 + 7.623365S)(1 + D_R/D * \cos\alpha)(1 + 0.349D)}{F * (254 - 2.54S)}.$$

10. The bearing assembly as recited in claim 9 wherein the at least one elastomeric annular damper has a first section and a second section spaced axially apart from the first section such that a compression of the first section is greater than a compression of the second section when a bending moment is applied to the bearing assembly in a first angular direction and the compression of the second section is greater than the compression of the first section when a bending moment is applied to the bearing assembly in a second, opposing angular direction so as to increase a fatigue life of the at least one elastomeric damper.

11. The bearing assembly as recited in claim 9 wherein the damper first section and the damper second section each have a radial thickness and are connected by an intermediate section having a radial thickness less than the radial thickness of each one of the damper first section and the damper second section such that the damper first and second sections are installable as a single unit.

12. The bearing assembly as recited in claim 9 wherein the at least one elastomeric annular damper is configured to have a first natural frequency that is no greater than about one third of a ball pass frequency of the bearing assembly.

13. The bearing assembly as recited in claim 9 wherein the at least one annular damper has an axial width and each one of the inner ring and the outer ring has an axial width, the damper being sized such that a ratio of the axial width of the damper to the axial width of each one of the inner and outer rings is within the range of about 0.75 and 0.9.

14. The bearing assembly as recited in claim 9 wherein each one of the inner ring and the outer ring has two opposing axial ends and the bearing assembly further comprises at least one elastomeric damper disk disposed between one axial end of the outer ring and a radial surface of the housing and/or between one axial end of the inner ring and a radial surface of the rotor.

15. The bearing assembly as recited in claim 9 wherein the at least one elastomeric damper is formed of a plurality of arcuate sections spaced circumferentially about the centerline and each having two opposing circumferential ends, each circumferential end of each one of the arcuate sections being disposed at least adjacent to one of the circumferential ends of another one of the arcuate sections.

16. A thin section bearing assembly for a gantry assembly, the gantry assembly including a static housing a bore and a rotor rotatable about a central axis, the bearing assembly comprising:
- a bearing outer ring disposable within the housing bore and having an inner circumferential surface with an annular groove, an outer circumferential surface, a radial thickness between the inner circumferential surface and the outer circumferential surface and an inside diameter, the outer ring being sized such that a ratio of the inside diameter to radial thickness is at least thirty (30);
- a bearing inner ring disposable about the rotor and having an inner circumferential surface, an outer circumferential surface with an annular groove, a radial thickness between the inner circumferential surface and the outer circumferential surface and an inside diameter, the outer ring being sized such that a ratio of the inside diameter to radial thickness is at least thirty (30);

a number of balls disposed between the outer ring groove and the inner ring groove; and at least one elastomeric annular damper disposed between the outer ring and the housing and/or between the inner ring and the rotor, the at least one elastomeric annular damper being configured to have a first natural frequency that is no greater than about one third of a ball pass frequency of the bearing assembly.

17. The bearing assembly as recited in claim 16 wherein the at least one elastomeric annular damper has a first section and a second section spaced axially apart from the first section such that a compression of the first section is greater than a compression of the second section when a bending moment is applied to the bearing assembly in a first angular direction and the compression of the second section is greater than the compression of the first section when a bending moment is applied to the bearing assembly in a second, opposing angular direction so as to increase a fatigue life of the at least one elastomeric damper.

18. The bearing assembly as recited in claim 17 wherein the damper first section and the damper second section each have a radial thickness and are connected by an intermediate section having a radial thickness less than the radial thickness of each one of the damper first section and the damper second section such that the damper first and second sections are installable as a single unit.

19. The bearing assembly as recited in claim 16 wherein each one of the plurality of rolling elements is a ball having a diameter ($D_R$) and traversing a circular path with a pitch diameter (D), the bearing assembly is configured to support a radial load (F) and to rotate at an angular speed (S), the annular damper has an axial width (b) and each one of the damper first section and the damper second section each have a radial thickness ($t_D$), the radial thickness ($t_D$) being calculated as follows:

$$t_D = 611.538 bDNR * \frac{(56 + 7.623365S)(1 + D_R/D * \cos\alpha)(1 + 0.349D)}{F * (254 - 2.54S)}.$$

20. The bearing assembly as recited in claim 16 wherein each one of the inner ring and the outer ring has two opposing axial ends and the bearing assembly further comprises at least one elastomeric damper disk disposed between one axial end of the outer ring and a radial surface of the housing and/or between one axial end of the inner ring and a radial surface of the rotor.

* * * * *